(12) United States Patent
Otani et al.

(10) Patent No.: US 6,327,060 B1
(45) Date of Patent: Dec. 4, 2001

(54) OPTICAL TRANSMISSION SYSTEM, OPTICALLY BRANCHING APPARATUS AND OPTICAL SIGNAL PROCESSING APPARATUS

(75) Inventors: Tomohiro Otani; Toshio Kawazawa; Koji Goto, all of Tokyo (JP)

(73) Assignees: Kokusai Denshin Denwa Kabushiki Kaisha; KDD Submarine Cable Systems Inc., both of Tokyo (JP)

( * ) Notice: Subject to any disclaimer, the term of this patent is extended or adjusted under 35 U.S.C. 154(b) by 0 days.

(21) Appl. No.: 09/034,932

(22) Filed: Mar. 4, 1998

(30) Foreign Application Priority Data

Mar. 4, 1997 (JP) .................................. 9-049394

(51) Int. Cl.[7] .......................... H04B 10/00; H04B 10/08; H04B 10/20; H04J 14/02
(52) U.S. Cl. .................. 359/110; 359/110; 359/127; 359/130; 359/119; 359/166
(58) Field of Search .................. 359/110, 127, 359/128, 119, 166, 124, 130

(56) References Cited

U.S. PATENT DOCUMENTS 5,742,416 * 4/1998 Mizrahi ................. 359/134
5,793,908 * 8/1998 Mizuochi et al. ......... 385/24
5,838,477 * 11/1998 Yamamoto et al. ........ 359/179

FOREIGN PATENT DOCUMENTS

| WO 97/01907 | * 1/1997 | (EP) | ............ H04L/12/437 |
| 2 268 017 A | 12/1993 | (GB) . | |
| 2 282 020 A | 3/1995 | (GB) . | |
| 63234751 | 9/1988 | (JP) . | |

* cited by examiner

Primary Examiner—Leslie Pascal
Assistant Examiner—M. R. Sedighian
(74) Attorney, Agent, or Firm—Christie, Parker & Hale, LLP (57) ABSTRACT

In an optical transmission system, an optical transmission line has up and down systems and loops back a supervisory light between the up and down systems. Trunk stations are provided at both ends of the optical transmission line and one or more optically branching units are provided in the optical transmission line for add/dropping a specific wavelength respectively. A branch station is connected to each of one or more the branching units. A bypass line for bypassing the supervisory light is provided in each of the one or more optically branching units.

9 Claims, 7 Drawing Sheets

OPTICAL TRANSMISSION SYSTEM, OPTICALLY BRANCHING APPARATUS AND OPTICAL SIGNAL PROCESSING APPARATUS

CROSS-REFERENCE TO RELATED APPLICATION

The following application discloses related subject matter to U.S. application Ser. No. 09/607,186, filed Jun. 29, 2000.

FIELD OF THE INVENTION

This invent ion r elates to an optical transmission system, an optically branching apparatus and an optical signal processing apparatus.

BACKGROUND OF THE INVENTION

In an optical fiber transmission system, especially such a long distance transmission system as an undersea optical fiber transmission system, a fault detection technique remotely monitoring a condition of an optical transmission line using a reflection or scattering light (referred as a supervisory light hereinafter) of a signal light or as special signal for supervision based on C-OTDR(Coherent optical Time Domain Reflectometry) is widely known.

Further, an optical fiber transmission system has a pair of optical transmission lines consisting of an up flow use and a down flow use as a basis and in a long distance optically amplifying repeater transmission system, a structure wherein an optically amplifying repeater has a loop back circuit for transmitting a reflection light or a scattering light from the up system to the down system and also from the down system to the up system is well known. Such a loop back circuit is designed for sending back an output light from an optical amplifier and a return light resulted from scattering or reflection in the up system to the down system and also sending back an output light of an optical amplifier and a scattering or reflection light in the down system to the up system.

With a loop back circuit of a conventional system, transmission characteristics of each part of a fiber transmission line can be monitored at a terminal of a transmission end. There is no problem using the conventional system in the connection of two points. However, in case of providing one or more branch stations, measurement or monitoring in accordance with C-OTDR cannot be performed between an optically branching unit connecting a branch station to a primary optical fiber transmission (specifically, an add/dropping circuit for add/dropping a specific wavelength assigned to the branch station) and an adjacent optically amplifying repeater (precisely, a loop back circuit in it). The reason is that a scattering light in the section is sometimes cut off by an add/dropping apparatus.

SUMMARY OF THE INVENTION

An object of the present invention is to provide an optical transmission system, an optically branching apparatus and an optical signal processing apparatus with the above mentioned problems all solved.

A further object of the present invention is to provide an optical signal processing apparatus of a simplified structure which sends back a scattering light to an up flow side for preventing the scattering light to enter an optically processing means.

In an optical transmission system according to the present invention, wherein one or more optically branching units for add/dropping a specific wavelength to an optical transmission line that has up and down systems and loops back a supervisory light between said up and down systems, a bypass line for bypassing a supervisory light is provided to each of one or more optically branching units.

By this structure, the supervisory light substantially passes through the optically branching units. In other words, the supervisory light continuously returns in the transmission line except the bypass line and, therefore, monitoring of the transmission condition at substantially all points by the supervisory light can be achieved.

By providing the bypass line to each of the up and down systems, it becomes possible for both trunk stations to monitor the condition in accordance with C-OTDR.

The optically branching unit further comprises an optically add/drop means for add/dropping the specific wavelength, first optically coupling means for passing through an optical signal added an optical signal of the specific wavelength at the optically add/drop means and for transmitting a supervisory light entered from a down flow side of the optical transmission line to the bypass line, and second optically coupling means for providing an input light, including optical signals to be dropped, inputted from an up flow side of the optical transmission line to the add/dropping means and for transmitting the supervisory light from the bypass line to the up flow side of the optical transmission line. Adopting this arrangement, it becomes possible for the supervisory light to bypass the optically add/dropping means and transmit in the opposite direction with a signal light. This system is useful in cases like the supervisory light should not be entering the optically add/dropping means and the optically add/dropping means cannot pass the supervisory light.

In each of the up and down systems, the optically branching units may be arranged to further comprise reflecting means for reflecting the specific wavelength selectively and first and second optical circulators having four input/output ports of A, B, C and D for outputting an input light of the port A from the port B, an input light of the port B from the port C and an input light of the port D from the port A. The first optical circulator has the port A connected to the up flow side of the optical transmission line, the port B connected to one end of the reflecting means, the port C connected to dropped light output means and the port D connected to one end of the bypass line. The second optical circulator has the port A connected to the other end of the reflecting means, the port B connected to the down flow side of the optical transmission, the port C connected to the other end of the bypass line and the port D connected to adding light input means. In this arrangement, the first and second optical circulators serve both roles of add/dropping the signal light and making the supervisory light to bypass and, therefore, both functions can be materialized with very few elements. With this arrangement, excellent transmission characteristics without any increase of unnecessary loss can be expected.

Each of the adding light input means and the dropped light output means comprises an optically amplifying means. Loop back means are provided both between an output stage of the optically amplifying means of the dropped light output means of the up system and an output stage of the optically amplifying means of the adding light input means of the down system and between an output stage of the optically amplifying means of the dropped light output means of the down system and an output stage of the optically amplifying means of the adding light input means of up system. By this structure, a quality of the transmission condition in the optically branching units can be monitored with the loop back light.

An optically branching apparatus according to the invention for dropping a specific wavelength light from an input light of the first optical transmission line, adding the specific wavelength light and outputting the result to the second optical transmission line comprises a reflecting means for reflecting the specific wavelength selectively, a bypass line for bypassing the reflecting means and first and second optical circulators having four ports of A, B, C and D and outputting an input light of the port A from the port B, an input light of the port B from the port C, an input light of the port D from the port A wherein the first optical circulator has the port A connected to the first optical transmission line, the port B connected to the one end of the reflecting means, the port C connected to a dropped light output terminal and the port D connected to one end of the bypass line and the second optical circulator has the port A connected to the other end of the reflecting means, the port B connected to the second optical transmission, the port C connected to the other end of the bypass line and the port D connected to an adding light input terminal.

By using a such arrangement, the first and the second optical circulators play both roles of add/dropping the signal light and making the supervisory light bypassed. Therefore, both functions can be materialized with very few elements. With this system, an excellent transmission characteristics without any increase of unnecessary loss can be expected.

An optical signal processing apparatus according to the invention for giving a predetermined process to an input signal light from the first optical transmission line and for outputting to the second optical transmission line comprises optical signal processing means for giving the predetermined process to the signal light, an optical bypass line parallel to the optical signal processing means and the first optically coupling means for transmitting an output light of the optical signal processing means to the second optical transmission line and for transmitting a return light inputted from the second optical transmission line into the bypass line, and second optically coupling means for providing the input signal light inputted from the first optical transmission line to the optical signal processing means and transmitting a return light from the bypass line into the first optical transmission line in the opposite direction with the input signal light.

Using such a structure, it is possible to prevent the return light entering the optical signal processing means. Even if the optical processing means prevent the return light to pass, it is possible to send the return light back to the first optical transmission line. By using optical circulators as the first and the second optically coupling means, these effects are obtained with very few losses.

DESCRIPTION OF THE PREFERRED EMBODIMENTS

Figure 1:
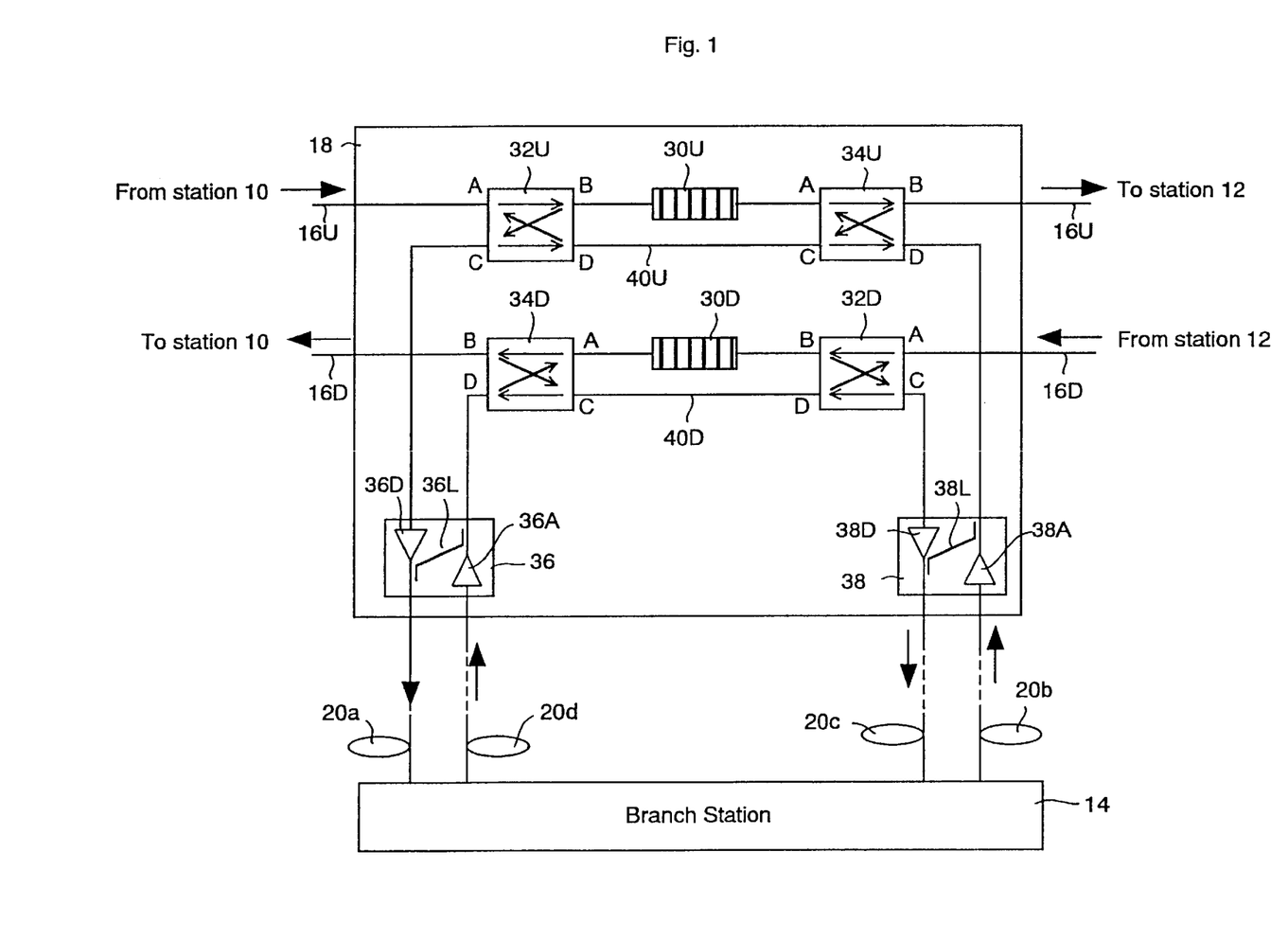
FIG. 1 is a schematic block diagram showing a general construction of a first embodiment of the invention.

An embodiment of the invention is described below in detail with reference to the accompanying drawings. FIG. 1 shows a schematic block diagram of an optically branching apparatus of a first embodiment of the invention and FIG. 2 shows a schematic block diagram of an optical transmission system using the optically branching apparatus shown in FIG. 1.

Figure 2:
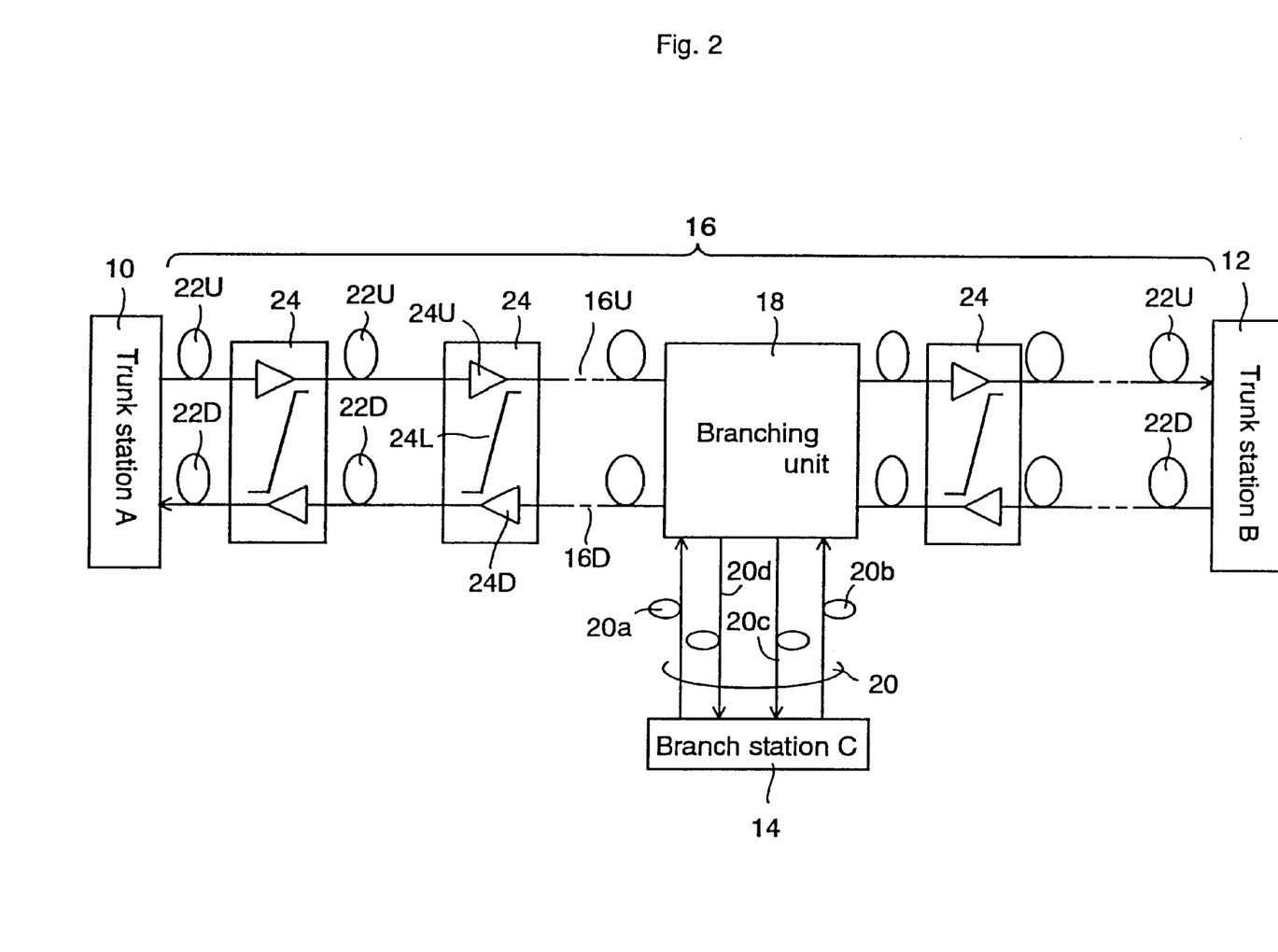
FIG. 2 is a schematic block diagram of an optical transmission system using the embodiment shown in FIG. 1.

FIG. 2 is described first. Numerals 10 and 12 denote trunk stations and numeral 14 denotes a branch station. A trunk line 16 consisting an up optical fiber transmission path 16U and a down fiber transmission path 16D is provided between the trunk stations 10 and 12. An optically branching unit (an optically add/dropping apparatus) for the branch station 14 is inserted in an appropriate part of the trunk line 16. An optical fiber branch line 20 consisting of four systems of optical fiber transmission paths 20a, 20b, 20c and 20d connects between the branch station 14 and the optically branching unit 18. The optical fiber transmission paths 20a and 20b are provided for accessing to the up optical fiber transmission path 16U of the trunk line 16 and the optical fiber transmission paths 20c and 20d are provided for accessing to the down optical fiber transmission path 16D of the trunk line 16.

The up optical fiber transmission path 16U and the down optical fiber transmission path 16D of the trunk line 16 are optically amplifying repeater transmission systems repeating more than one optical transmission fibers 22U and 22D with an optically amplifying repeater 24. The optically amplifying repeater 24 consists of an up system optical amplifier 24U. a down system optical amplifier 24D and a loop back optical circuit 24L that slightly couples the up system and the down system mutually to make the supervisory signal multiplexing in two directions, namely from the up system to the down system and the other way around. A structure of the loop back circuit 24L is widely known and since it has no connection with the characteristic structure of the invention a detailed description of it is omitted. The optically amplifying repeater 24 is generally arranged ten kilometers apart for example 70 km apart. An optically amplifying repeater similar to the optically amplifying repeater 24 is sometimes arranged in the optical fiber branch line 20 owing, to the distance.

In communication between the trunk stations 10 and 12 and communication between the trunk stations 10, 12 and the branch station 14, different wavelength lights are usually used. Assuming that wavelength $\lambda a$ is used for the communication between trunk stations 10 and 12 and a different wavelength $\lambda b$ used for the communication between the trunk stations 10, 12 and the branch station 14. Although the details are described below, the optically branching unit 18 passes through only an optical signal of the wavelength $\lambda a$ in optical signals of the wavelength $\lambda a$ and $\lambda b$ from the trunk stations 10 and 12 and outputs to the trunk stations 12 and 10 and, on the other hand, drops and outputs the wavelength $\lambda b$ to the branch station 14 and adds the signals of wavelength $\lambda b$ from the branch station 14 to the passing through optical signals of the wavelength $\lambda a$ and outputs the result to the trunk station 10 or 12.

FIG. 1 is explained here. To make it easier to understand, the branch station 14 and the branch line 20 are also shown in FIG. 1. The arrows show merely directions of signal lights.

Numerals 30U and 30D denote fiber gratings for reflecting the wavelength λb selectively and numerals 32U, 34U, 32D and 34D denote optical circulators having four ports of A, B, C and D. The optical circulators 32U, 34U, 32D and 34D are optical elements for outputting an input light of the port A from the port B, an input light of the port B from the port C, an input light of the port C from the port D and the input light of the port D from the port A. Those elements are now on the market. Fuji Denkikagaku Kabushikikaisha, for examples, sells as YC-115A-130(for 1.31 $\mu$m) and YC-115A-155(for 1.55 $\mu$m) and the insertion loss between the ports for passing is no more than 1 dB. In this embodiment, however, a transmission from the port C to the port D is not employed.

Numerals 36 and 38 denote optically amplifying apparatus that amplifies optical signals transmitting in the branch line 20 between the branching unit 18 and the branch station 14 and consists of optical amplifiers 36A and 38A for amplifying a light to be added, optical amplifiers 36D and 38D for amplifying a dropped light, and loop back circuits 36L and 38L. The optically amplifying apparatus 36 and 38 basically have the same structure and specification with the optically amplifying repeater 24. The optically amplifying apparatus 36 and 38 are sometimes omitted, sometimes arranged exterior to the optical branching unit 18 and sometimes an optically repeating amplifier apparatus on the branch line 20 becomes the alternative.

The port A of the optical circulator 32U is connected to the up optical fiber path 16U from the trunk station 10, the port B is connected to one end of the fiber grating 30U, the port C is connected to the input of the optical amplifier 36D in the optical amplifier apparatus 36 that amplifies dropped light and the port D is connected to the port C of the optical circulator 34U through the bypass line 40U of the fiber grating 30U.

The port A of the optical circulator 34U is connected to the other end of the fiber grating 30U, the port B is connected to the up optical fiber line 16U that goes toward the trunk station 12, the port C is connected to the port D of the optical circulator 32U through the above mentioned bypass line 40U and the port D is connected to the output of the optical amplifier 38A in the optical amplifier apparatus 38 that amplifies light to be added.

The port A of the optical circulator 32D is connected to the down optical fiber path 16D from the trunk station 12, the port B is connected to one end of the fiber grating 30D, the port C is connected to the input of the optical amplifier 38D in the optically amplifying apparatus 38 that amplifies dropped light and the port D is connected to the port C of the optical circulator 34D through the bypass line 40D of the fiber grating 30D.

The port A of the optical circulator 34D is connected to the other end of the fiber grating 30D, the port B is connected to the optical fiber path 16D that goes toward the trunk station 10, the port C is connected to the port D of the optical circulator 32D through the bypass line 40D as mentioned above and the port D is connected to the output of optical amplifier 36A in the optically amplifying apparatus 36 that amplifies light to be added.

The input of optical amplifier 36A and the output of optical amplifier 36D in the optically amplifying apparatus 36 are connected to the branch station 14 through optical fiber transmission paths 20d and 20a respectively and the input of optical amplifier 38A and the output of optical amplifier 38D in the optically amplifying apparatus 38 are connected to the branch station 14 through optical fiber transmission paths 20b and 20c respectively.

Figure 3:
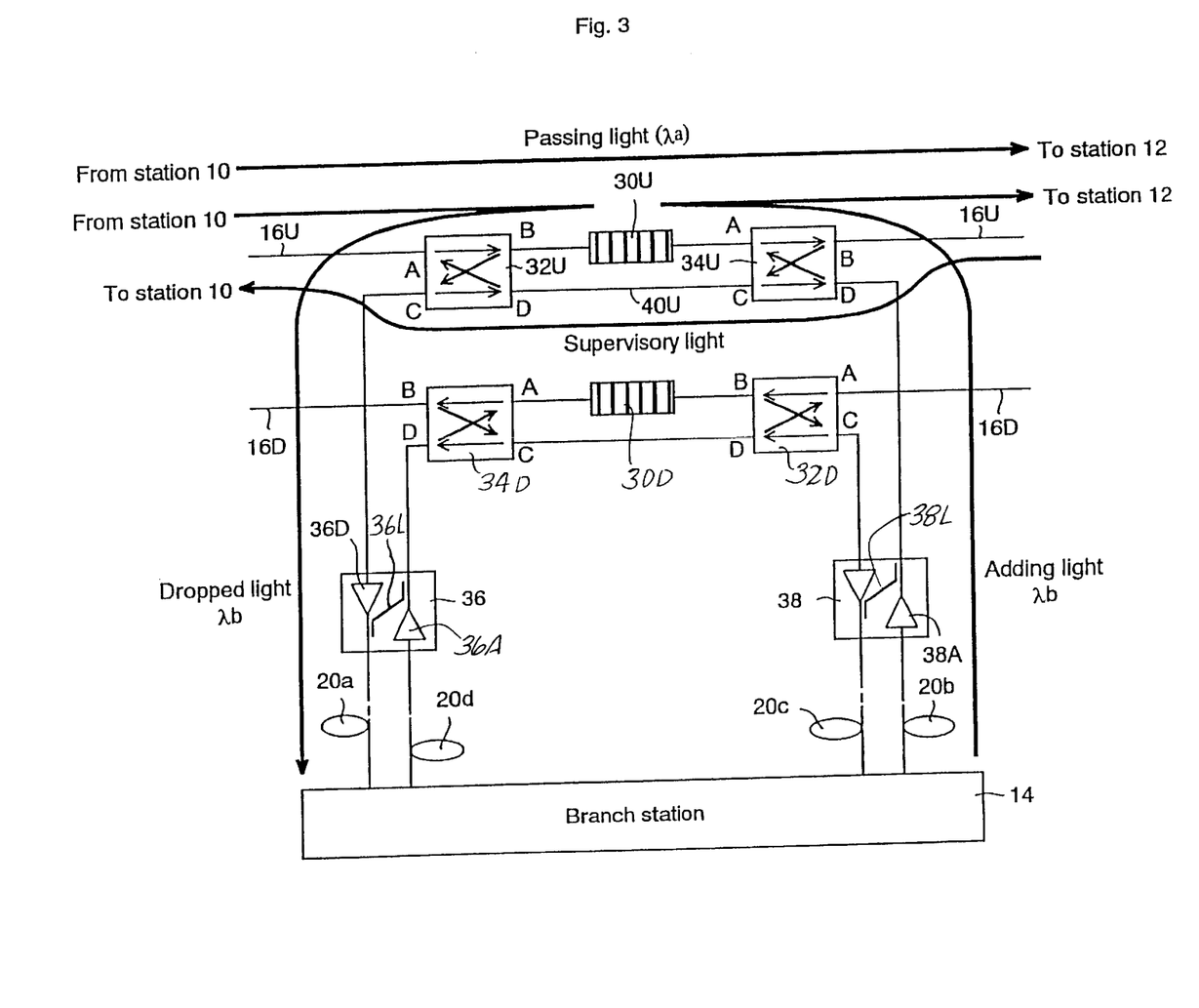
FIG. 3 is a diagram showing of a flow of a signal light and a supervisory light in the apparatus shown in FIG. 1.

FIG. 3 shows a flow of optical signals that add/drop to the up optical fiber path 16U and a flow of the supervisory light which flows backward in the up optical fiber path 16U from the direction of the trunk station 12.

The optical signals of wavelength λa and λb transmitting in the up fiber path 16U from the trunk station 10 input to the port A of the optical circulator 32U and enter to the fiber grating 30U from the port B. Since the fiber grating 30U is designed to reflect the wavelength λb, the wavelength λb is reflected and enters to the port B of the optical circulator 32U again, while the optical signals of wavelength λa pass through the fiber grating 30U. The optical signals of wavelength λb inputted to the port B of the optical circulator 32U output from the port C and enter to the optical amplifier 36D in the optically amplifying apparatus 36. The output light of the optical amplifier 36D inputs to the branch station 14 through an optical fiber transmission path 20a in the branch line 20. The optical signals of wavelength λa passing through the fiber grating 30U enter to the up optical fiber transmission path 16U and transmit toward the trunk station 12.

The branch station 14 transmits the optical signals (wavelength λb), going toward the trunk station 12, to the optical fiber transmission path 20b in the branch line 20. The optical signals are amplified by the optical amplifier 38A in the optically amplifying apparatus 38 and enter to the port D of the optical circulator 34U. As the optical circulator 34U outputs the input light of the port D from the port A, the optical signals of wavelength λb outputted from the branch station 14, after all, enter to the fiber grating 30U, are reflected there and input to the port A of the optical circulator 34U again. The optical signals of wavelength λb that enter to the port A of the optical circulator 34U output from the port B and transmitted to the up fiber transmission path 16U going toward the trunk station 12.

In this manner, the optical signals of wavelength λb from the up fiber path 16U are dropped toward the branch station 14 and the optical signals of wavelength λb from the branch station 14 are added to the light passing through the fiber grating 30U and output to the up optical fiber path 16U of the down flow side.

The supervisory light transmitting in the reverse direction in the up optical transmission path 16U due to the scattering or reflection occurred in the up optical fiber transmission path 16U between the branching unit 18 and the trunk station 12 inputs to the port B of the optical circulator 34U in the branching unit 18. So that the supervisory light outputs from the port C of the optical circulator 34U and inputs to the port D of the optical circulator 32U through the bypass line 40U. As the optical circulator 32U outputs an input light of the port D from port A, the supervisory light from the side of the trunk station 12 finally transmits to the up optical transmission path 16U toward the trunk station 10.

The optical amplifiers 36 and 38 have loop back circuits 36L and 38L built-in and therefore transmit a dropped light and a scattering or a reflection light occurred in the optical branch line 20 from the up system to the down system and in the reverse direction. For example, an output light of the optical amplifier 36D (optical signals of wavelength λb dropped from the up optical transmission path 16U) and the supervisory light which occurred from a scattering or reflection at the optical fiber transmission path 20a in the branch line 20 coupled slightly with the output stage (that is, the optical signals of wavelength λb which should be added to the down system) of the optical amplifier 36A by the loop back circuit 36L and input to the port D of the optical circulator 34D. Since the optical circulator 34D outputs the input light of the port D from the port A, the supervisory light and the optical signals of wavelength λb output from the branch station 14 are both inputted to the fiber grating 30D, reflected there, inputted to the port A of optical circulator 34D again and transmit from the port B to the down optical fiber line 16D going toward the trunk station 10.

A flow of the loop back of the supervisory light from the down system to the up system is the same as this and with this flow of the supervisory light, the trunk stations 10 and 12 can remotely monitor the condition of the optical fiber paths 20a and 20c in the branch line 20. The branch station 14 can also monitor the transmitting conditions of the optical fiber paths 20b and 20d in the branch line 20 using the supervisory light. However, by providing loop back circuits similar to the loop back circuits 24L, 36L and 38L at input/output parts of branch station 14, the whole branch line 20 can be monitored at the trunk stations 10 and 12.

Like this, in this embodiment, the optical circulators 32U and 34U used for add/dropping serve also for making the supervisory light to bypass the fiber grating 30U. Therefore, it becomes possible to transmit the supervisory light on a series of lines with a simplified arrangement consisting very few optical devices. Excessive loss factors for the optical signals do not occur because additional optical elements such as demultiplexing elements, multiplexing elements and optical isolators are unnecessary. If only add/dropping the wavelength λb, the optical circulators 32U and 34U can be circulators having three ports. However, if make them three, the supervisory light inputted from the side of the trunk station 12 does not enter to the fiber grating 30U. Depending upon the transmission characteristics among the three ports, it can be obstructive that the supervisory light sometimes transmits toward the branch station 14.

Figure 4:
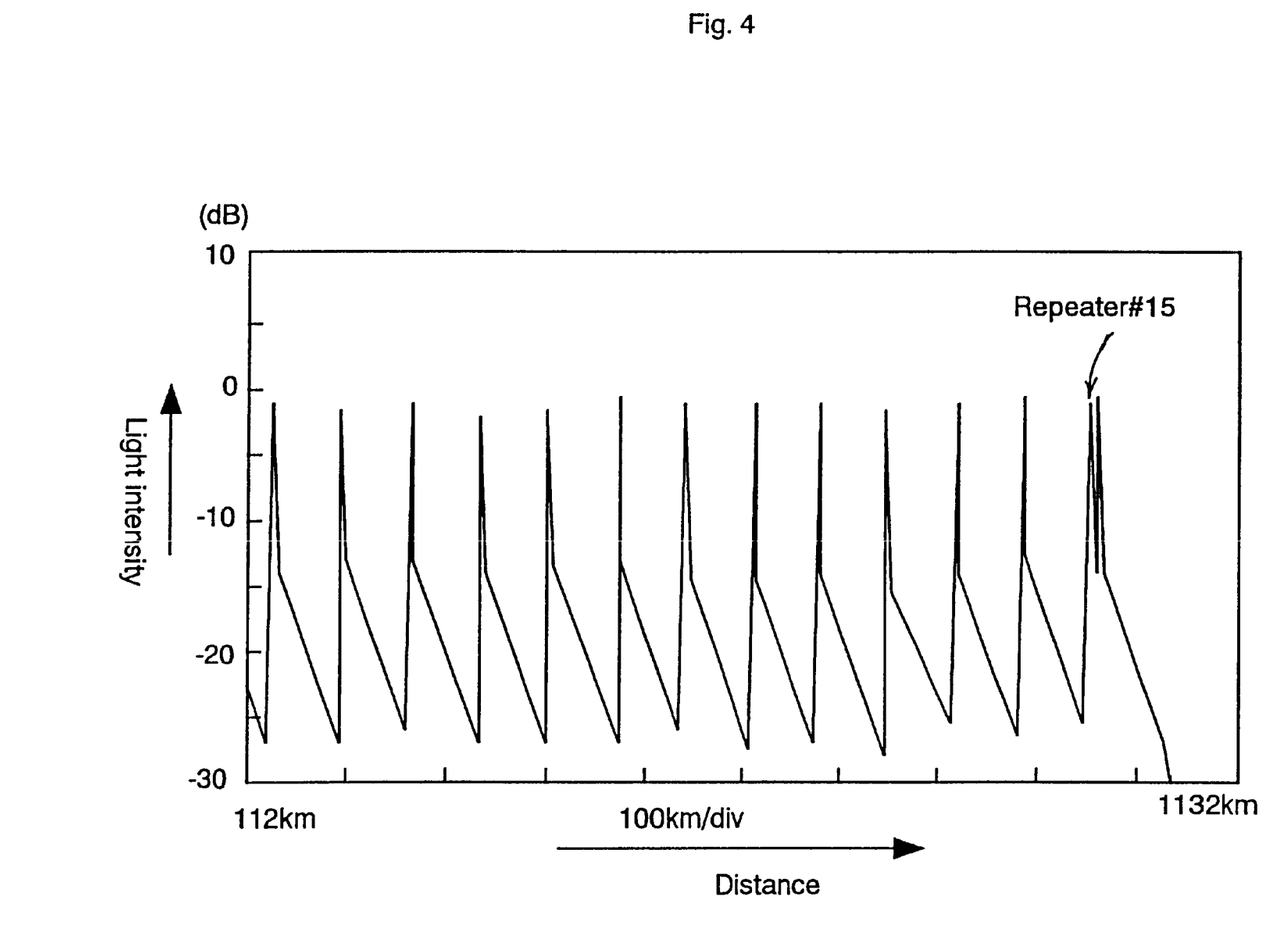
FIG. 4 is a result of a supervisory light measurement of a branch wavelength $\lambda b$ in an optically branching unit 18.
Figure 5:
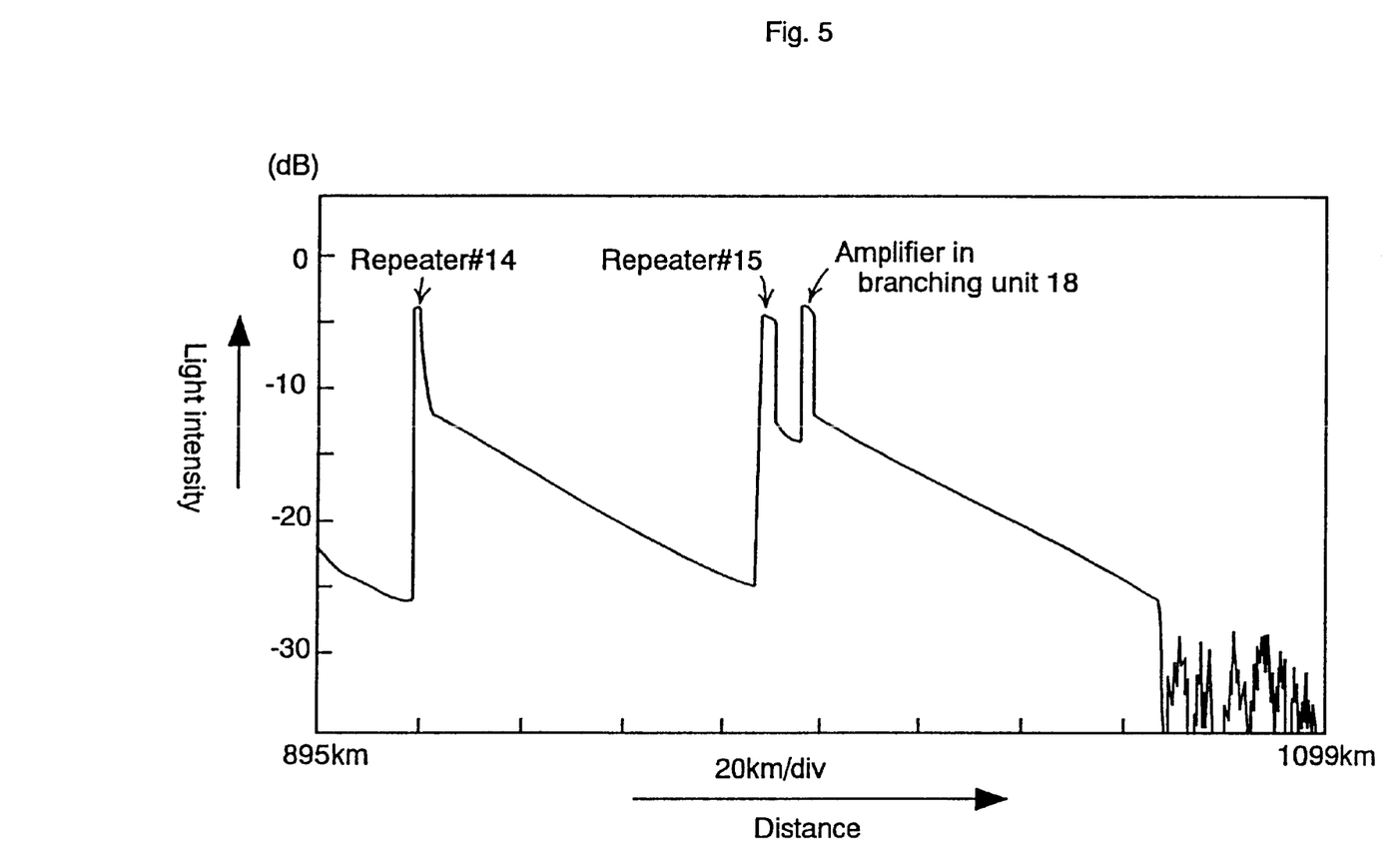
FIG. 5 is an enlarged diagram of FIG. 4.

FIG. 4 shows a result of measurement in which the trunk station 10 has measured the supervisory light (the supervisory light entering from the down optical fiber transmission path 16D) of the branch wavelength λb using C-OTDR, by providing an optical branching unit 18 between the fifteenth optically amplifying repeater apparatus 24 and the sixteenth optically amplifying repeater apparatus 24. FIG. 5 shows an enlarged diagram of the surroundings of optically branching unit 18. In FIGS. 4 and 5, the vertical axis shows the light intensity (dB) and the horizontal axis shows the distance respectively. The distance between the fifteenth optically amplifying repeater apparatus 24 and the branching unit 18 is 10 km. FIG. 5 shows that the condition of between the fifteenth optically amplifying repeater apparatus 24 and the optical amplifier 36D in the optically branching unit 18 and the condition of optical fiber transmission path 20a in the branch line 20 between the optical amplifier 36D and the branch station 14 have been measured.

Figure 6:
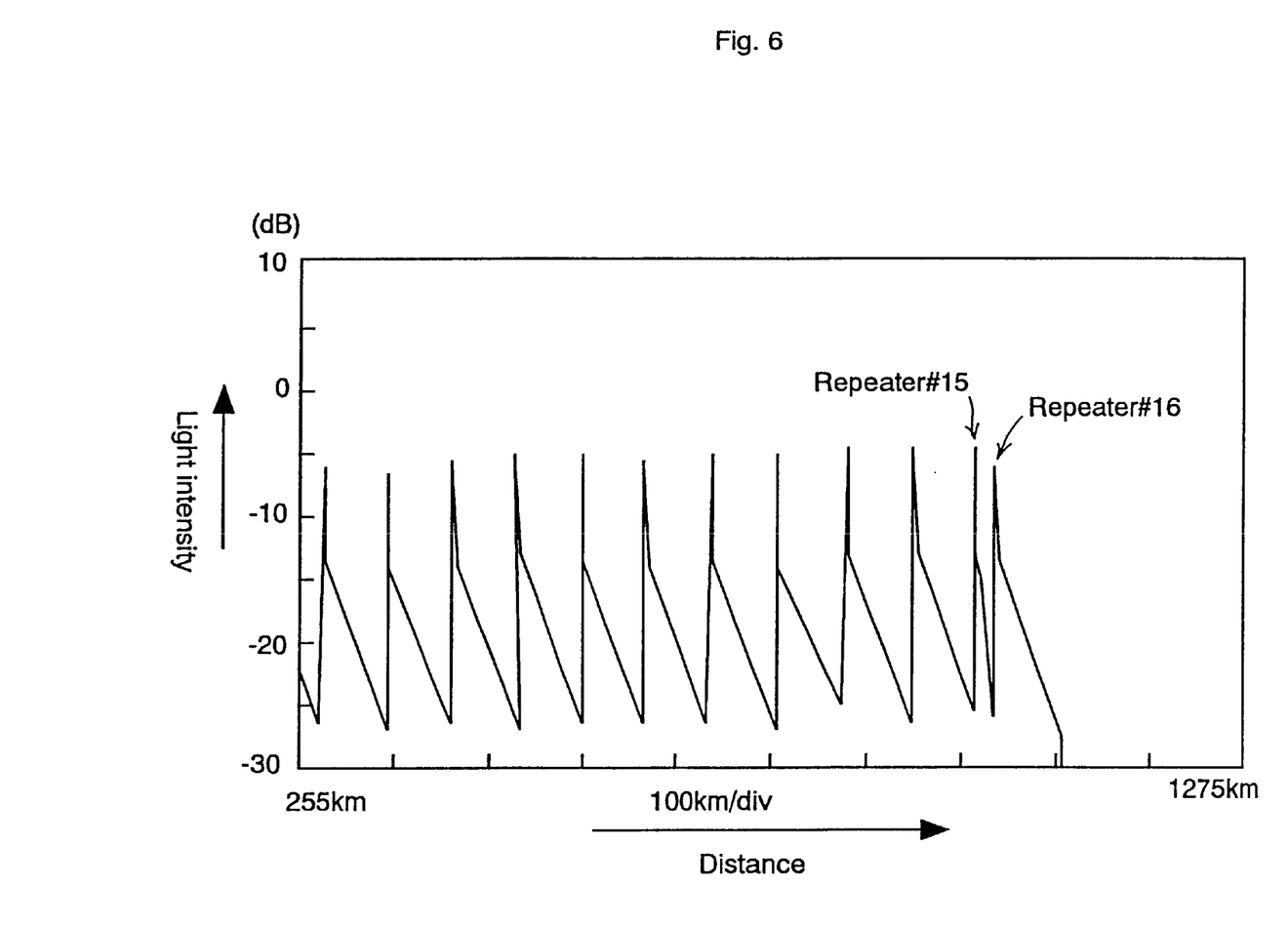
FIG. 6 is a result of a supervisory light measurement of a passing wavelength $\lambda a$ of an optically branching unit 18.
Figure 7:
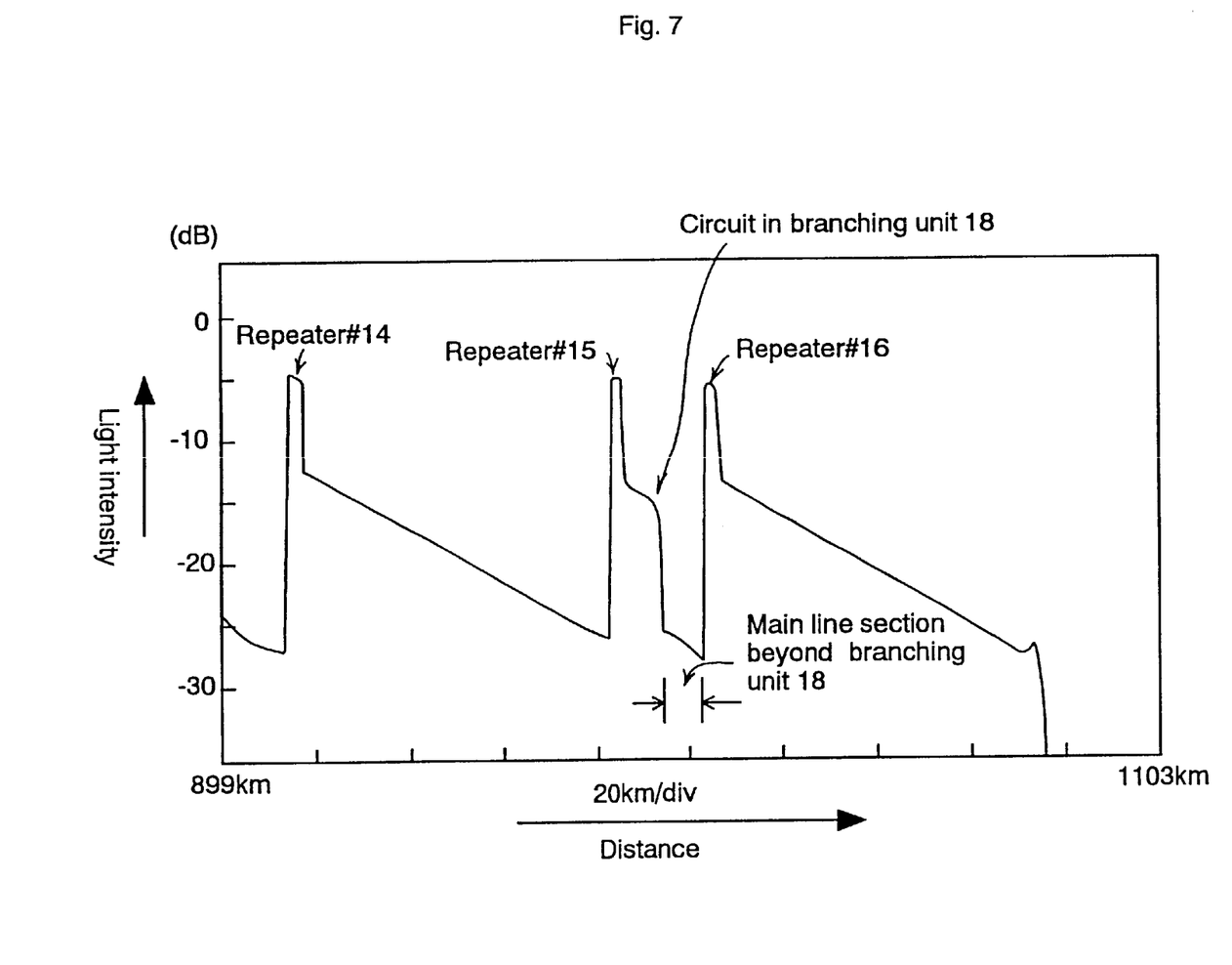
FIG. 7 is an enlarged diagram of FIG. 6.

FIGS. 6 and 7 having the same arrangements as FIGS. 4 and 5 show a result of measurement of wavelength λa passing through the optically branching unit 18. The distance between the optically branching unit 18 and the sixteenth optically amplifying repeater apparatus 24 is, however, 11 km. The back stage of the sixteenth optically amplifying repeater apparatus 24 is connected to an optical fiber with its length about 70 km long and its end made unreflective. In FIGS. 6 and 7, the vertical axis shows the measured light intensity of the supervisory light and the horizontal axis shows the distance respectively. FIG. 7 shows an enlarged diagram of the surroundings of the optically branching unit 18.

It is clear from FIG. 7 that a section between the fifteenth optically amplifying repeater apparatus and the sixteenth optically amplifying repeater apparatus can be divided to three parts of between the fifteenth optically amplifying repeater apparatus and the optically branching unit 18, inside of the optically branching unit 18 and between the optically branching unit 18 and the sixteenth optically repeating apparatus. The supervisory light attenuates normally between the fifteenth optically amplifying repeater apparatus and the optically branching unit 18, then attenuates rapidly in the part corresponding to the inside of the optical unit 18 and again attenuates normally in the up optical transmission path 16U between the optically branching unit 18 and the sixteenth optically amplifying repeater apparatus 24. The reason of the rapid attenuation in the part corresponding to the inside of the optically branching unit 18 is because that optical elements of low loss can be used as the optical circulators 32U, 34U; 32D and 34D and the bypass lines 40U and 40D. If a three port circulator is used for add/dropping, at least a result of measurement on the up optical transmission path 16U between the optically branching unit 18 and the sixteenth optically amplifying apparatus 24 becomes almost a noise level and a transmitting condition of the section cannot be remotely monitored.

In this embodiment of the invention, as the optical circulator serves as both roles of add/dropping the specific wavelength and making the supervisory light bypassed, it is possible to send the supervisory light to the up flow side without any additional elements, namely without any additional insertion loss. It becomes also possible to get rid of every part which cannot be monitored by the supervisory light.

The embodiment of the invention applied to the add/dropping apparatus which add/drops the specific wavelength is explained here. However, it can be also applied for various uses such as preventing the return light from entering to the optical processing device doing any other light process. If only for making the return light to bypass, it can be obtained by providing three ports optical circulators in front and back of the light processing device so that the return light bypasses.

As readily understandable from the above explanation, according to the invention, as the supervisory light can transmit on a series of transmission lines except very few parts with a very simplified arrangement, a transmitting condition can be remotely monitored by the supervisory light practically and continuously except the few parts. Further, in case that it is desired to send back the return light of the up flow side to the up flow side, but there are some elements to which the return light might not be entered, it is possible to prevent a characteristic degradation of the elements and a degradation of a transmission characteristic by sending back the return light bypassing the elements to a series of transmission lines with a very simplified arrangement.

Since the optical circulator serves as both roles of add/dropping the specific wavelength and making the supervisory light to bypass, the supervisory light can bypass without any additional elements. Because the insertion loss of the optical circulator is small, it can be obtained with very few optical elements without accompanied by any additional insertion loss.

While the invention has been described with reference to the specific embodiment, it will be apparent to those skilled in the art that various changes and modifications can be made to the specific embodiment without departing from the spirit and scope of the invention as defined in the claims.

We claim:

1. An optical transmission system comprising:
an optical transmission line having up and down systems, means for looping back a supervisory light between the up and down systems, and an optical branching, unit for adding and dropping a specific wavelength, said optical branching unit having a bypass line for bypassing the supervisory light;
a trunk station at each end of the optical transmission line; and
a branch station connected to the optical branching unit, wherein the optical branching, unit further comprises in each of the up and down systems:
a reflecting means for selectively reflecting the specific wavelength;
means for dropping light of said specific wavelength;
means for adding light of said specific wavelength; and
first and second optical circulators each having first, second, third and fourth in/out ports, each said circulator adapted for outputting to said second port light inputted into the first port, for outputting to said third port light inputted into the second port, and for outputting to said first port light inputted into the fourth port, the first optical circulator having the first port connected to an up flow side of the optical transmission line, the second port connected to one end of the reflecting means, the third port connected to the means for dropping light, and the fourth port connected to one end of the bypass line, and the second optical circulator having the first port connected to the other end of the reflecting means, the second port connected to a down flow side of the optical transmission line, the third port connected to the other end of the bypass line, and the fourth port connected to the means for adding light, and wherein the means for adding light and the means for dropping light each comprise an optical amplifier, and further comprise a first loop back circuit between an output stage of the optical amplifier of the means for dropping light of the up system and an output stage of the optical amplifier of the means for adding light of the down system, and a second loop back circuit between an output stage of the optical amplifier of the means for dropping light of the down system and an output stage of the optical amplifier of the means for adding light of the up system.

2. An optical transmission system comprising:
an optical transmission line having an up system and a down system;
a loop back optical circuit capable of looping back a supervisory light between the up system and the down system;
an optical branching unit disposed on the optical transmission line having a first optical add/drop device for the up system and a second optical add/drop device for the down system;
trunk stations at each end of the optical transmission line; and
a branch station connected to the optical branching unit;
wherein the first optical add/drop device comprises,
a reflector to selectively reflect a specific wavelength,
a bypass line,
an optical input port to add light output from the branch station to be added to the up system,
an optical output port to drop light dropped from the up system to be applied to the branch station,
first and second optical couplers each having first, second, third and fourth ports, each said coupler adapted to output to said second port light inputted into the first port, to output to said third port light inputted into the second port, and to output to said first port light inputted into the fourth port, the first optical coupler having the first port connected to an up flow side of the up system in the optical transmission line, the second port connected to an end of the reflector, the third port to output the dropped light toward the output port, and the fourth port connected to an end of the bypass line, and the second optical coupler having the first port connected to another end of the reflector, the second port connected to a down flow side of the up system in the optical transmission line, the third port connected to another end of the bypass line, and the fourth port to receive the added light from the input port.

3. The optical transmission system as defined in claim 2 wherein the second optical add/drop devices comprises:
a second reflector to selectively reflect a second specific wavelength;
a second bypass line;
a second input port of second added light output from the branch station to be added to the down system;
a second output port of second dropped light dropped from the down system to be applied to the branch station;
third and fourth optical couplers each having first, second, third and fourth ports, each said coupler adapted to output to said second port light inputted into the first port, to output to said third port light inputted into the second port, and to output to said first port light inputted into the fourth port, the third optical coupler having the first port connected to an up flow side of the down system in the optical transmission line, the second port connected to an end of the second reflector, the third port to output the second dropped light toward the second output port, and the fourth port connected to an end of the second bypass line, and the fourth optical coupler having the first port connected to another end of the second reflector, the second port connected to a down flow side of the down system in the optical transmission line, the third port connected to another end of the second bypass line, and the fourth port to receive the second added light from the second input port.

4. The optical transmission system as defined in claim 3 wherein the first optical add/drop device further comprises a first optical amplifier to optically amplify the added light from the input port to apply to the fourth port of the second optical coupler and a second optical amplifier to optically amplify the dropped light output from the third port to output toward the branch station;
the second optical add/drop device further comprises a third optical amplifier to optically amplify the second added light from the second input port to apply to the fourth port of the fourth optical coupler and a fourth optical amplifier to optically amplify the second dropped light output from the third port to output toward the branch station; and
the optical branching unit further comprises a first loop back circuit to optically connect the output of the first optical amplifier and the output of the fourth optical amplifier and a second loop back circuit to optically connect the output of the second optical amplifier and the output of the third optical amplifier.

5. The optical transmission system as defined in claim 3 wherein the third and fourth optical couplers each comprises an optical circulator.

6. The optical transmission system as defined in claim 2 wherein the first optical add/drop device further comprises a first optical amplifier to optically amplify the added light from the input port to apply to the fourth port of the second optical coupler and a second optical amplifier to optically amplify the dropped light output from the third port of the first optical coupler to output toward the branch station;

the second optical add/drop device further comprises an optical add/drop multiplexer to add/drop light having a second specific wavelength from the light propagating in the down system, a third optical amplifier to optically amplify second added light output from the branch station to be added to the down system to apply to the optical add/drop multiplexer and a fourth optical amplifier to optically amply the light dropped by the optical add/drop multiplexer to output toward the branch station; and the optical branching unit further comprises a first loop back circuit to optically connect the output of the first optical amplifier and the output of the fourth optical amplifier and a second loop back circuit to optically connect the output of the second optical amplifier and the output of the third optical amplifier.

7. The optical transmission system as defined in claim 2 wherein the first and second optical couplers each comprises an optical circulator.

8. An optical branching apparatus disposed on an optical transmission line to transmit signal light in a predetermined direction, comprising:

a reflector to reflect a specific wavelength;

a bypass line;

an input port to add light;

an output port to drop light; and first and second optical couplers each having first, second, third and fourth ports, each said coupler capable of outputting to said second port light inputted into the first port, to output to said third port light inputted into the second port, and to output to said first port light inputted into the fourth port, the first optical coupler having the first port connected to an up flow side of the optical transmission line, the second port connected to an end of the reflector, the third port connected to the output port, and the fourth port connected to an end of the bypass line, and the second optical coupler having the first port connected to another end of the reflector, the second port connected to a down flow side of the optical transmission line, the third port connected to another end of the bypass line, and the fourth port connected to the input port.

9. The optical branching apparatus as defined in claim 8 wherein the first and second optical couplers each comprises an optical circulator.

* * * * *